Nov. 7, 1967  YOSHIHIRO HATANAKA ET AL  3,351,172
COIN CONTROLLED MERCHANDISE EJECTING APPARATUS WITH
RECIPROCATING MERCHANDISE EJECTING RACKS
Filed Feb. 14, 1966  6 Sheets-Sheet 5

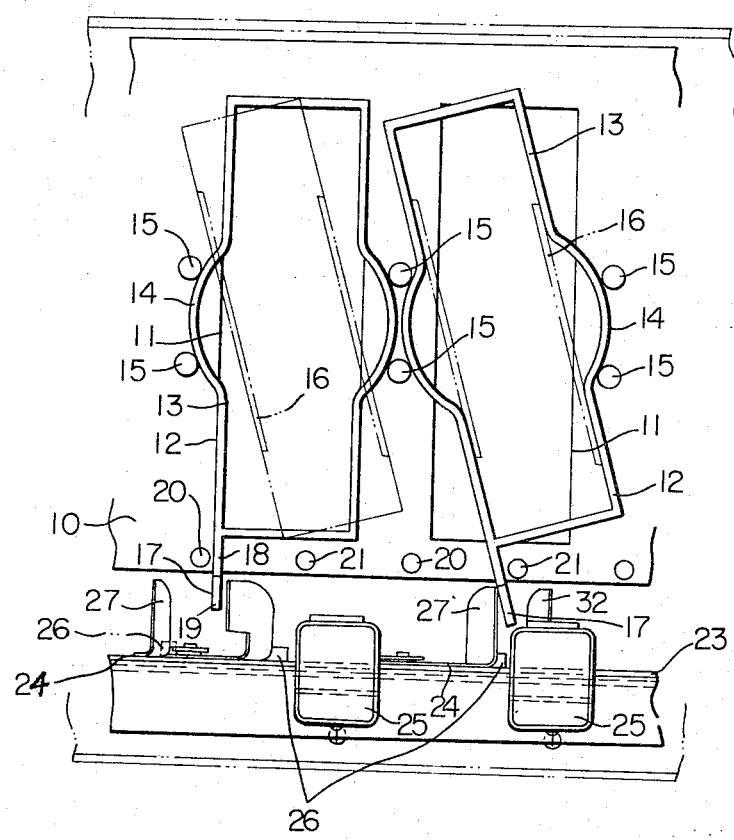

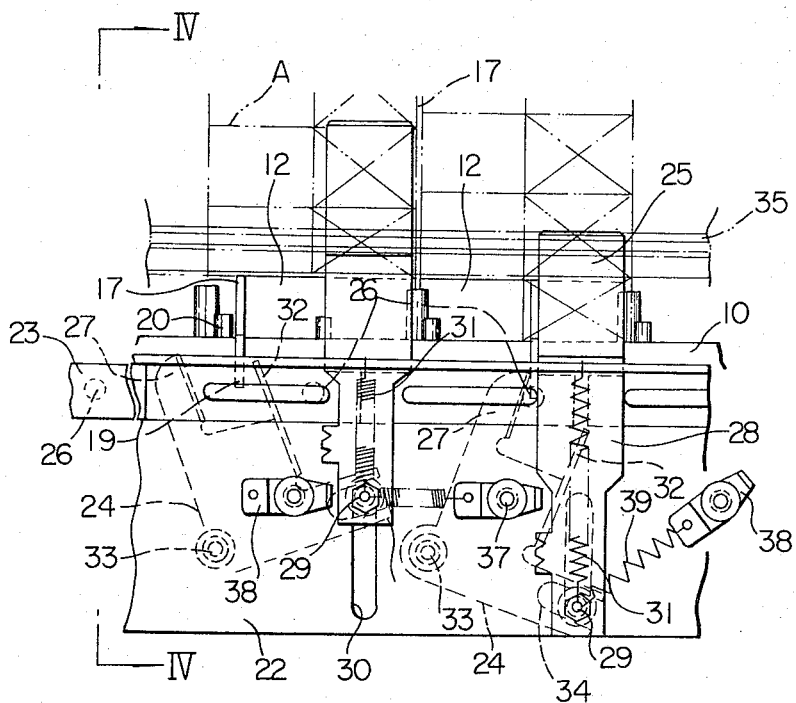

Y. Hatanaka and
Y. Kinoshita
INVENTORS

BY Wenderoth,
Lind & Ponack ATTORNEYS

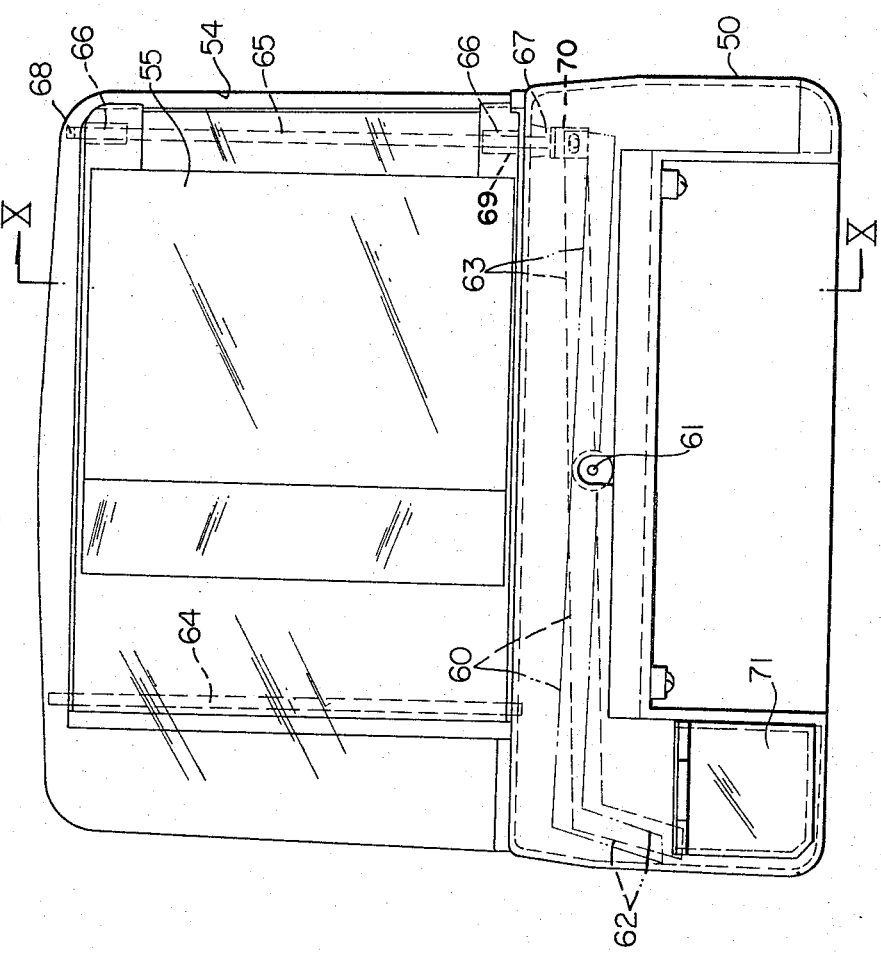

United States Patent Office 3,351,172
Patented Nov. 7, 1967

3,351,172
COIN CONTROLLED MERCHANDISE EJECTING APPARATUS WITH RECIPROCATING MERCHANDISE EJECTING RACKS
Yoshihiro Hatanaka and Yoshio Kinoshita, Himeji-shi, Japan, assignors to Kokuei Machinery Mfg. Co., Ltd., Himeji-shi, Japan
Filed Feb. 14, 1966, Ser. No. 527,004
Claims priority, application Japan, Feb. 26, 1965, 40/11,130; July 15, 1965, 40/42,934; July 29, 1965, 40/62,438
5 Claims. (Cl. 194—71)

This invention relates to a merchandise ejecting apparatus of automatic merchandise vending and handling machines and the like.

Heretofore, in this type of merchandise ejecting apparatus, the merchandise stored in the merchandise storing rack was drawn out from the bottom of this rack by means of a mechanism in which the bottommost article in a merchandise storing rack is pushed out to the outside of the rack by means of a rotatable angle member which turns about a pivot disposed below the rack, or a mechanism in which the article is pushed out from the rack by means of a push rod which makes to-and-fro horizontal movements from the outside of the rack towards the inside thereof. Alternatively a mechanism has been used wherein the articles, which are stored aslant in the storing rack in an overlapping fashion, are ejected one by one to the outside of the rack by the opening and closing actions of a pivoted rack bottom, or a mechanism wherein a notched cam is rotated about a center and the articles are ejected one by one to the outside of the rack by this means. In all of these instances, the ejection mechanism is one in which the articles are ejected horizontally and the disposition of the mechanism is either below or to the side of the rack. In consequence, the scope of action of the mechanism is great, thus resulting in a large space to be occupied thereby. Hence, the over-all size of the merchandise ejecting apparatus becomes large so that it becomes impossible to install the apparatus in narrow space.

The object of the present invention resides in reducing the scope of action of the ejecting mechanism and thus to reduce the space occupied by the merchandise ejecting apparatus.

This object of the invention is achieved by providing such that the center of the action of the mechanism for ejecting the stacked articles falls on the extension of the axis which connects the central points of the stacked articles.

Accordingly, the gist of the present invention resides in a merchandise ejecting apparatus of a vending machine, which comprises a frame having a plurality of holes for the downward passage of articles, a plurality of a merchandise storing racks provided on top of said frame spaced with a clearance from the frame and disposed fixedly in an angular position with respect to said respective holes and such that their centerline is in substantial coincidence with that of said holes, the width of said storing racks being substantially equal to that of said holes, a plurality of merchandise ejecting racks disposed between said frame and the lower end of said merchandise storing racks and adapted to rotate substantially about the center of said drop hole from a position in alignment therewith to an angular position so as to be in alignment with the storing rack thereby to be dispensed with an article from the storing rack concerned, and means secured to said frame and adapted to rotate one of said merchandise ejecting racks selectively to its angular position.

Further, there is provided in the means for selectively rotating the ejecting rack of the invention apparatus, a coin screening device for starting up the apparatus by the insertion of a coin. Again, the merchandise ejecting apparatus is installed in a housing and a locking means is provided for locking up the merchandise stored in the storing rack and the drawer which contains the cash derived from the sales of the merchandise.

The invention apparatus whose make-up is as hereinabove described is very small in size, and if part of the housing is enclosed with a transparent material, the entire merchandise stacked in the angularly positioned storing racks can be observed through the transparent material. Hence, the vending machine can be used installed in an exceedingly limited space.

The invention will be more fully understood from the following description taken in connection with the accompanying drawings, in which:

FIGURE 2 is plan view partially broken away of the apparatus of this invention.

FIGURE 3 is an elevation seen from the front of FIGURE 2.

FIGURE 4 is a side view as seen in the direction IV—IV of FIGURE 3.

FIGURE 9 is a rear view of the case and cover for enclosing the invention apparatus, which are shown with their locking means.

FIGURE 10 is a view in section taken on line X—X of FIGURE 9.

Figure 1:
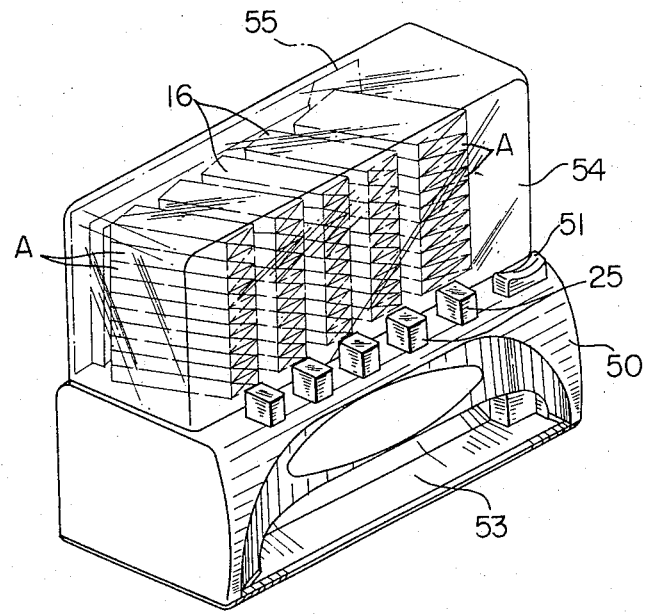
FIGURE 1 is a perspective view of the apparatus of the invention.

In FIGURES 2 and 3, a frame plate 10 is provided with drop holes 11 for articles A, the holes being lined up in such a fashion as to face the front of the frame, and above these drop holes 11 are provided merchandise ejecting racks 12 in a number corresponding to the number of the drop holes and as to be angularly displaceable about the axis of the holes, which is perpendicular to the opening thereof. The merchandise ejecting racks are substantially of the same configuration as that of the bottom side of each article A, the top and bottom opening being a somewhat flared opening 13. The ejecting racks 12 are also provided with arcuate protuberant stoppers 14, which are formed protruding outwardly from both sides of approximately the midsection of the racks 12. A pair of studs 15 are secured in the frame plate 10 at each side of the holes 11 so as to be adjacent thereto, and the stoppers 14 are in rotatable engagement with the studs 15. Merchandise storing racks 16, made of transparent material, in which are stacked and stored the articles A, are secured in a position above the ejecting racks 12. The merchandise storing rack 16 are so disposed that when they are stacked and stored with articles, the centerline of the articles passes through the aforesaid central axis of the drop holes while the racks are positioned angularly with respect to the holes. The side walls of the racks are secured to a plate 35. The bottom end of the merchandise storing racks is made to coincide with the hole provided in the top side of the hereinafter described case 50.

The aforesaid merchandise ejecting racks 12 are integrally provided with a projecting piece 17 which extends from end of the rack downwardly in hook fashion. This projecting piece is made up of a part 18 which extends from the rack 12 and a part 19 which bends perpendicular from the extended part 18. In the frame in front of each drop hole and close thereto are provided projections 20 and 21. When the rack 12 is brought into alignment with the drop hole 11, one side of the extended part 18 abuts against the projection 20. On the other hand, when the rack 12 is rotated by means of the hereinafter described rotating means, the other side of the extended part 18 abuts against the projection 21 and the rack 12 is made to be in alignment with the merchandise storing rack 16.

The means for rotating the rack 12 consists of an arm 23 which is slidable along a fixed plate 22 fitted at the front of the frame plate 10, drive levers 24 which selectively rotate the aforesaid ejecting racks 12 while causing the arm 23 to make a sliding movement, and push button means 25 which actuate one of said levers. The arm 23 has projections 26 provided thereon facing the frame at positions corresponding to the drop holes. When the hereinafter described push button is pressed, the drive lever 24 is rotated and hence the projection 26 is pressed by means of the projection 27 of the lever 24, with the consequence that the arm 23 is moved slidingly. The push button 25, which has extending downwardly therefrom a push plate 28, is adapted to be capable of vertically sliding movements along a guide slot 30 provided transversely of a fixed plate 22, by means of a guide rod 29 affixed to the push plate 28. Further, a spring 31 is mounted between the guide rod 29 and the fixed plate to bias the push button normally upwardly. The levers 24 are of toggle type lever arrangement having two projections 27 and 32 which face the frame and are pivotally attached to the fixed plate 22 at 33. At one end of the lever 24 apart from the projections 27 and 32, there is provided a short groove 34 through which the guide rod 29 passes. When the push button is pressed, the lever 24 is swung about its pivot 33, and the foregoing projection 27 abuts against one side of the bent part 19. Thus when the push button is pressed and the lever 24 is swung, the projection 27, while pushing the projection 26, pushes the part 19 in the direction in which the arm 23 slides and effects the angular displacement of the rack 12. On the other hand, the projection 32 for returning the rack 12 to its former position abuts against the other side of the portion 19. Hence, when the push button reverts to its original position and the lever 24 likewise reverts to its original position, the projection 32 presses the portion 19 in its reversional direction.

Figure 5:
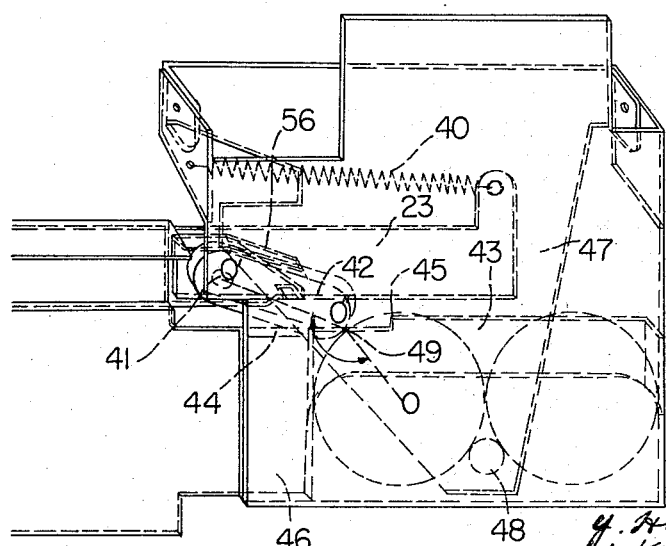
FIGURE 5 is a perspective view of a coin screening device.

A spring 40 is mounted between one end of the arm 23 and the fixed plate (FIGURE 5), and the arm after making an advancing movement against the bias of the spring is returned to its original position by the tension of the spring. Further, the fixed plate is provided with a guide (not shown) for the arm so as to permit its slidable movement along the frame. The push plate 28 has provided protrudingly from its one side a gear 36 which, when the push plate is depressed, is capable of engagement with one side of a guide piece 38 pivoted at 37 to the fixed plate 22. The other end of the guide piece 38 is attached to the fixed plate via a spring 39. Thus, when the gear engages one end of the guide piece, the reversion of the pressing plate is prevented until the arm stroke is completed. Namely, when the push button is pressed and the gear of the push plate and the guide piece engage, the relative position between the guide piece and the gear are maintained such that is to revert to its original position, the guide piece is turned in a direction in which it does not engage the gear. For information, a locking (not shown) by a conventional means is provided so that another button may not be pushed while one of push buttons 25 is being pushed.

When the foregoing apparatus is to be used as a vending machine, it must be such that the arm 23 is slidingly moved by pressing the push button only upon insertion of the proper coins in a proper amount. At the end of the arm 23 in its advancing direction there is provided a screening lever 42 whose distal end is of arcuate shape, which being pivotally mounted at 41 is biased downwardly by means of a leaf spring 56. One end of the lever 42 slides over a cutaway upper edge 44 of a guide plate 43 fitted to the fixed plate 22 and collides against a stopper 45 of the cutaway edge. The guide plate 43 is provided with a cylindrical holding piece 46, while a plate 47, which is swingable towards the guide plate 43, has a cylindrical holding pin 48 protruding therefrom. Since the plate 47 normally presses the pin 48 against the guide plate 43, the holding piece 46 and holding pin 48 normally maintain a fixed relative position. The distance between the holding piece 46 and the holding pin 48 is smaller than the diameter B of a proper coin. When a proper coin is held between the holding piece and pin, the upper edge of the coin protrudes beyond the upper edge of the stopper 45.

Figure 6:
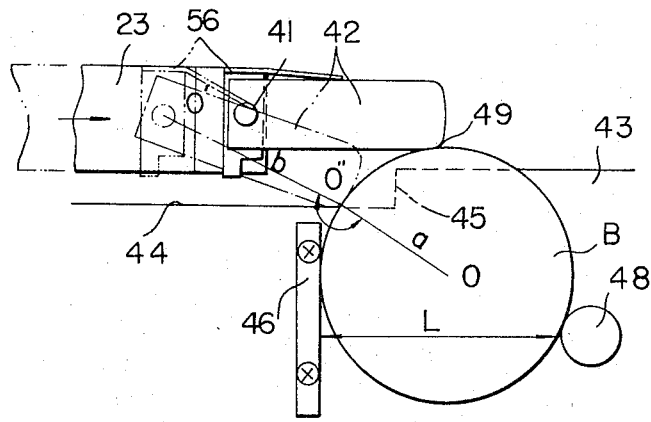
FIGURES 6–8 are views which illustrate the action of the coin screening device on the various occasions it encounters.
Figure 7:
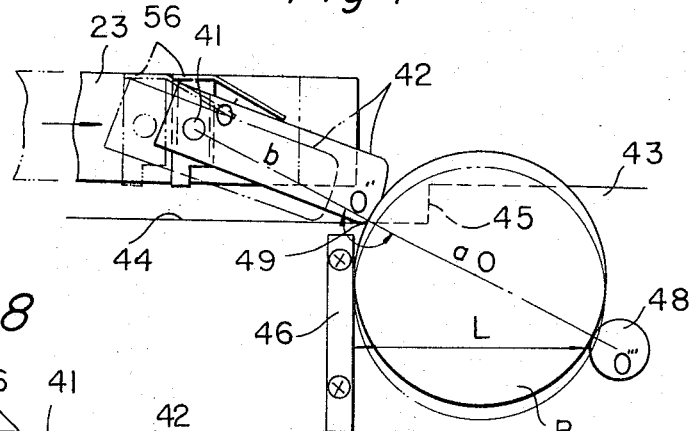
Figure 8:
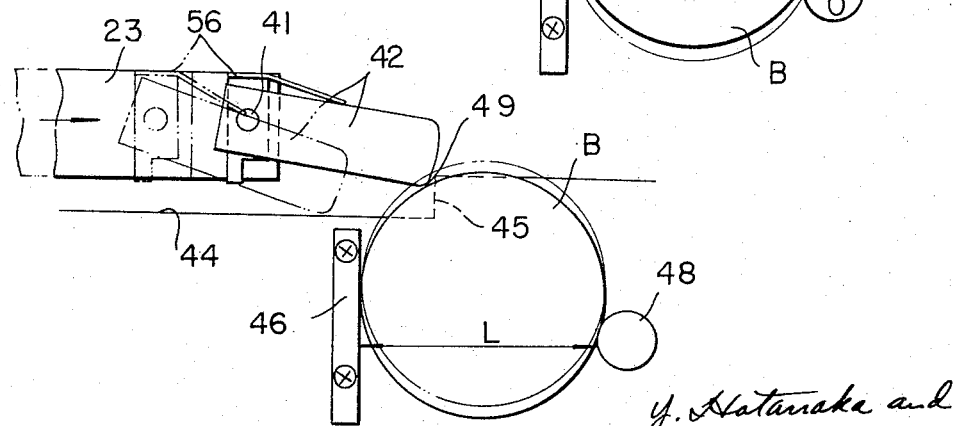

When the arm 23 moves against the bias of the spring 40 (to the right of the drawing) in a state in which a proper coin is held between the members 46 and 48, the distal end 49 of the lever 42 which is depressed by means of the spring 56 glides over the upper edge 44 and comes into contact with the rim of the coin. At this time, if the point of contact O″ is on opposite side the holding piece 46 relative of a straight line connecting the center O of the coin and the pivot point 41, i.e. O′, or in other words, to the right of the straight line O O′ in the drawing, the lever 42 makes a pivot movement against the bias of the spring 56 to follow along the upper rim of the coin and the arm 23 continues its travel. (See FIGURE 6). However, when the diameter of the coin B′ is larger than that of a proper coin, the point O″ is on the side of the holding piece 46 relative of the line O O′. Hence, the lever 42 acts as if to press against the upper rim of the coin by means of the spring 56, and even though the arm 23 is moved, the distal end of the lever 42 only presses downwardly against the coin and does not turn upwardly. Hence, the travel of the arm 23 is stopped. On the other hand, when the diameter of the coin B″ is smaller than that of a proper coin, the top edge of the stopper 45 protrudes beyond the upper rim of the coin (FIGURE 8), and hence the distal end 49 of the lever 42 strikes the stopper 45, whereby the travel of the arm 23 is stopped.

When the sale is to be made at this time with a plurality of coins, the coins which have been inserted previously are conducted to another holding part and only the coin which has been inserted last is held by the aforesaid members 46 and 48. When the arm 23 completes its movement to the right of the drawing, the plate 47 and the guide plate 43 are opened by a suitable means (not shown) and upon separation from the guide plate of the pin 48, which is secured to the plate 47, the coin is released downwardly. Further, with respect to the screening of the coins, this can also be carried out by limiting the length of the coin slot 51 in the case of those coins having a large diameter.

The hereinbefore-described apparatus is housed in a case 50. The case 50 is provided in its top surface in angularly slanted position with respect to the merchandise drop holes which correspond with the positions of the merchandise ejecting holes 11. It also is provided with corresponding holes for the push buttons 25 and the coin slot 51. Thus, when all of the members are fitted to the frame plate 10 and the complete assembly is housed in the case 50, the operation of the push buttons 25 and the insertion of the coin into the coin slot 51 is made possible from the outside of the case, as shown in FIGURE 1. The case 50, as shown in FIGURE 4, is provided with a sloping guide plate 52, which inclines from the rear part of the case towards the merchandise discharge opening 53 at the front. Thus, the merchandise which has been dropped from the drop holes 11 are made to slide over the guide plate 52 to the discharge opening 53.

The top of the case 50 is further enclosed with a transparent cover 54 for encasing the merchandise storing racks 16. The rear of the cover 54 is provided with a door 55 to provide access to the racks 16 for replenishing the sold merchandise, this door 55 normally being in a locked state. The locking arrangement is preferably one which, when unlocked, unlocks the door as well as other parts of the vending machine, say, the coin storage box.

The locking of the machine is by means of a bent lever 60 pivotally mounted at 61 in the frame plate 10, the locking being effected by a bent part 62 of the lever and a part 63 at the opposite end from the bent part. The lever 60 is normally biased by means of a spring (not shown) mounted on pivot part 61 in the locking direction. At the opposite side from the hinge 64 of the door 55, a locking bolt 65 is provided passing through guide holes 66, and in the upper part of the cover 54, a catch hole 68 for receiving the bolt 65 is provided. The bolt 65 is fitted with a suitable stop means to ensure that it does not project into the case 50 when it descends. Facing the lower guide hole 66, there is provided another guide hole 67 in the case 50. In the latter guide hole there is fitted slidably therein a piece 70 having a pin 69 projecting from its upper end, the opposite end of the piece 70 being pivotally supported by the lever 60 at the part 63. The part 62 of the lever 60 is adapted to engage with the coin storage box 71.

In this state, the lever 60 normally is in engagement with the box 71 with the part 62, while the part 63 locks the locking bolt 65 by pushing it up via the piece 70. However, when the pivot part 61 is turned by means of a key against the bias of the spring tension, the engagement between the part 62 and the box is released and at the same time the part 63 moves so as to lower the piece 70 with the consequence that the engagement of the bolt 65 with the hole 68 is released. Thus, the lock is unfastened at two places and makes possible the removal of the storage box 71 as well as the opening of the door 55.

The invention apparatus is operated in the following manner. First, when the key is inserted in the pivot part 61 and the lock is disengaged, the lever 60 moves from the dotted line position to the solid line position, as shown in FIGURE 9, and since the engagement between the bolt 65 and the catch hole 68 is released, the door 55 can be opened. The merchandise is stacked in the merchandise storing racks 16 in an angular position. At this time, the coin storage box 71 can be removed and the coins collected up to this time can be taken out. After supplying the storing racks 16 with merchandise and closing the door 55, if the required number of the proper coin is inserted from the coin slot 51 and one of the push buttons 25 is depressed, the push plate 28, as a result of its downward travel, swings the drive lever 24, which is pivoted to itself, about the pivot 33. The lever 24, in turn, presses with its engaging projection 27 of the corresponding projection 26 of the arm 23 to move the arm slidingly to the right against the bias of the spring 40. At this time, if the coin inserted was proper, the screening lever 42 pivoted to the distal end of the arm continues its sliding movement. As a result of the sliding movement of the arm 23, the projecion 27 pushes the part 19 of the merchandise ejecting rack 12, and thus with the stoppers 14 of the rack 12 sliding along the studs 15, the rack 12 is angularly displaced under the merchandise storing rack 16 until it comes into alignment with the latter.

The merchandise falls into the rack 12 from the rack 16 and then, upon releasing the push button, the push plate is reverted to its original position by means of the spring 31. At this time, since the drive lever 24 reverts in the opposite direction and the projection 32, which is used for the reversion action, pushes the part 19 in the opposite direction, the rack 12 reverses its previous movement and reverts to its original position, at which position the merchandise, which had been held by the rack 12 and that part of the case aside the hole 11, drops down onto the sloping guide plate 52 as a result of the alignment of the hole 11 with the rack 12 and thence proceeds to the discharge opening 53 from which it can be taken out.

As previously described, if the coin that is inserted at the coin slot 51 is not of the proper denomination, the screening lever either does not move fully upwardly along the rim of the coin or is impeded by the stopper 45, and hence the sliding movement of the arm is hampered so that no ejection of merchandise takes place. On the other hand, even though the pressing of the push button 25 is stopped at an intermediate point, it does not revert to its original position from this point, since this is prevented by means of the engagement of the gear 36 with the guide piece 38.

It is to be understood that the invention is not restricted to the embodiment illustrated, and that the details of consruction may be modified and rearranged in accordance with the scope of the invention as defined in the appended claims.

We claim:

1. A merchandise ejecting apparatus for a vending machine, said apparatus comprising a frame plate having a plurality of elongated holes therein for the downward passage of articles, a plurality of merchandise storing racks disposed above said frame plate and spaced therefrom, each of said merchandise storing racks being fixedly disposed in an angular position with respect to the elongated axis of said plurality of holes and such that centers of said racks fall substantially on a vertical axis through the respective holes, a plurality of merchandise ejecting racks interposed between said frame plate and said merchandise storing rack and having a size no larger than and a shape substantially the same as said holes and a peripheral shape and depth not exceeding to the shape and depth of the merchandise, each of said merchandise ejecting racks being pivotally mounted so as to be oscillatable about the axis of each said holes from an original and empty position in alignment with said holes to a receiving position in alignment with said merchandise storing racks, and thus being adapted to receive one of the articles merchandise stacked in the merchandise storing rack and return to the original position in alignment with the hole to discharge said received article of merchandise from said ejecting rack through said hole after the completion of a reciprocating cycle, a plurality of actuating means secured to said frame and adapted to oscillate the respective merchandise ejecting racks selectively from the original position to the receiving position and a housing having a case with a coin storage box therein and a cover, said housing having a single locking means for locking the cover to the housing and locking the coin storage box in the housing.

2. An apparatus as claimed in claim 1 and further comprising a coin size sensing means for sensing coins of the proper size for articles to be dispensed and coupled to said actuating means for blocking movement of said actuating means when said sensing means senses an improper size coin.

3. An apparatus as claimed in claim 2 in which said coin size sensing means comprises spaced coin holding elements for holding a coin in an upright position, one of said elements being movable away from the other to permit the coin to drop between said elements, said elements being normally spaced a distance less than the diameter of the proper size coin for the article to be dispensed and such that the periphery of a coin of a larger size than that of the proper coin will project upwardly farther than the periphery of the proper size coin, and the periphery of a coin of a smaller size than that of the proper coin will lie below the periphery of the proper size coin, a sliding arm slidable toward and away from the position of said elements, a sensing lever pivoted to said sliding arm and spring biased in the downward direction, the free end of said sensing lever contacting a proper size coin held in said elements at a point above a line between the pivoting point of said lever and the center of the coin when the lever is in contact with the coin to permit the lever to move along the upper part of the periphery of the coin and permit the sliding arm to continue to slide, and contacting a coin which is too large at a point below a line between the pivoting point of the lever and the center of the coin to block movement of the lever and the sliding arm, and an abutment adjacent the upper portion of the periphery of a coin held in said elements and projecting above the periphery of a coin which is too small and lying below the periphery of a proper size coin, said lever running along the periphery of a coin which is too small and abutting said abutment to block further movement of said lever and said sliding arm.

4. An apparatus as claimed in claim 3 wherein said locking means comprises a bent lever pivotally mounted in the case for rotating by a key, one end being bent for engaging and locking the coin storage box, and the end opposite said bent end engaging and actuating an operative part for accomplishing locking of the cover to the housing.

5. A merchandise ejecting apparatus as claimed in claim 6 in which said ejecting racks each have a frame-like shape with a cylindrical projection on opposite sides thereof concentric with said axis, and said frame plate having studs thereon with which said cylindrical projections are engaged and guiding said ejecting racks for rotational movement about said axis.

References Cited

UNITED STATES PATENTS

| | | | |
|---|---|---|---|
| 485,140 | 10/1892 | Slater | 194—71 |
| 969,844 | 9/1910 | Clawson | 221—264 |
| 1,048,660 | 12/1912 | Clawson | 221—264 X |
| 1,356,345 | 10/1920 | Dun Lany | 221—131 X |
| 1,465,052 | 8/1923 | Morgan | 194—54 |
| 2,759,632 | 8/1956 | Ussery et al. | 221—155 X |
| 3,010,607 | 11/1961 | Probasco | 221—154 X |

FOREIGN PATENTS

| | | |
|---|---|---|
| 723,579 | 2/1955 | Great Britain. |
| 756,343 | 9/1956 | Great Britain. |

WALTER SOBIN, *Primary Examiner.*